US010640289B1

(12) United States Patent
Roberts

(10) Patent No.: US 10,640,289 B1
(45) Date of Patent: May 5, 2020

(54) BAGGAGE CONVEYOR AND STORAGE SYSTEM

(71) Applicant: Katherine Rose Roberts, Lakewood, CO (US)

(72) Inventor: Katherine Rose Roberts, Lakewood, CO (US)

( * ) Notice: Subject to any disclaimer, the term of this patent is extended or adjusted under 35 U.S.C. 154(b) by 122 days.

(21) Appl. No.: 16/035,610

(22) Filed: Jul. 14, 2018

Related U.S. Application Data

(63) Continuation-in-part of application No. 15/212,207, filed on Jul. 16, 2016, now abandoned.

(51) Int. Cl.
| | | |
|---|---|---|
| *B65G 1/127* | (2006.01) | |
| *B65G 47/57* | (2006.01) | |
| *B65G 17/16* | (2006.01) | |
| *B65G 17/22* | (2006.01) | |
| *B64D 11/00* | (2006.01) | |
| *B65G 17/00* | (2006.01) | |
| *B65G 17/12* | (2006.01) | |

(52) U.S. Cl.
CPC ........... *B65G 1/127* (2013.01); *B65G 17/005* (2013.01); *B65G 17/123* (2013.01); *B65G 17/16* (2013.01); *B65G 17/22* (2013.01); *B65G 47/57* (2013.01); *B64D 11/003* (2013.01); *B65G 2201/0264* (2013.01)

(58) Field of Classification Search
CPC .... B65G 1/127; B65G 17/005; B65G 17/123; B65G 17/16; B65G 17/22; B65G 17/34; B65G 47/57; B65G 2201/0264; B61D 47/00; B64D 11/003; B64F 1/368

USPC ......... 198/347.3, 435, 457.01, 476.1, 477.1, 198/794, 801, 802; 414/331.04, 331.08, 414/331.16, 679
See application file for complete search history.

(56) References Cited

U.S. PATENT DOCUMENTS

| | | | | |
|---|---|---|---|---|
| 774,476 | A * | 11/1904 | Hughes ................ | B65G 17/123 198/475.1 |
| 791,601 | A * | 6/1905 | Andrus ........................ | 198/793 |
| 975,181 | A * | 11/1910 | Turnbull ...................... | 198/802 |
| 1,793,062 | A * | 2/1931 | Collier ................ | B65G 17/123 198/800 |
| 2,522,686 | A * | 9/1950 | Murphy ................ | B61D 47/00 105/329.1 |

(Continued)

FOREIGN PATENT DOCUMENTS

| | | | | |
|---|---|---|---|---|
| DE | | 4436702 A1 * | 4/1995 | ........... B65G 17/123 |
| WO | WO-2014191162 A1 * | | 12/2014 | ............. B65G 47/57 |

*Primary Examiner* — James Keenan
(74) *Attorney, Agent, or Firm* — Edwin H. Crabtree; Ramon L. Pizarro

(57) ABSTRACT

An automated baggage conveyor and storage system used in a transportation vehicle for receiving baggage from a passenger. The system includes a vertical conveyor, with drive motor. The vertical conveyor includes baggage trays mounted on a conveyor belt and under the control of an electronic sensor for starting and stopping the conveyor belt. Next to the top of the vertical conveyor is one end of a motor driven, horizontal conveyor. When a passenger places a piece of baggage on one of the trays, it is lifted to the top of the vertical conveyor and transferred to the horizontal conveyor. The piece of baggage is then moved along a length of the overhead storage compartment, where the baggage remains stored during transit.

14 Claims, 4 Drawing Sheets

(56) References Cited

U.S. PATENT DOCUMENTS

| | | | | | |
|---|---|---|---|---|---|
| 3,415,353 | A | * | 12/1968 | Oertle, Jr. | B65G 17/063 198/479.1 |
| 3,684,079 | A | * | 8/1972 | Kuehl | B65G 17/123 198/799 |
| 4,379,671 | A | * | 4/1983 | Cochran | B65G 65/00 198/571 |
| 4,621,969 | A | * | 11/1986 | Berghall | B65G 65/00 414/331.07 |
| 5,050,726 | A | * | 9/1991 | Flagg | B65G 17/123 198/475.1 |
| 5,405,240 | A | * | 4/1995 | Uno | B65G 57/32 414/331.04 |
| 5,860,784 | A | * | 1/1999 | Schuitema | B65G 1/0407 414/280 |
| 6,971,608 | B2 | * | 12/2005 | Harrington | B64D 11/0007 244/118.5 |
| 7,744,033 | B2 | * | 6/2010 | Gonzalez Linero | B64D 9/00 244/118.1 |
| 8,019,464 | B2 | * | 9/2011 | Hoffjann | B64D 9/00 700/223 |
| 8,596,947 | B1 | * | 12/2013 | Stenzel | B64F 1/368 414/331.04 |
| 8,596,948 | B2 | * | 12/2013 | Miles | B65B 5/106 414/331.01 |

\* cited by examiner

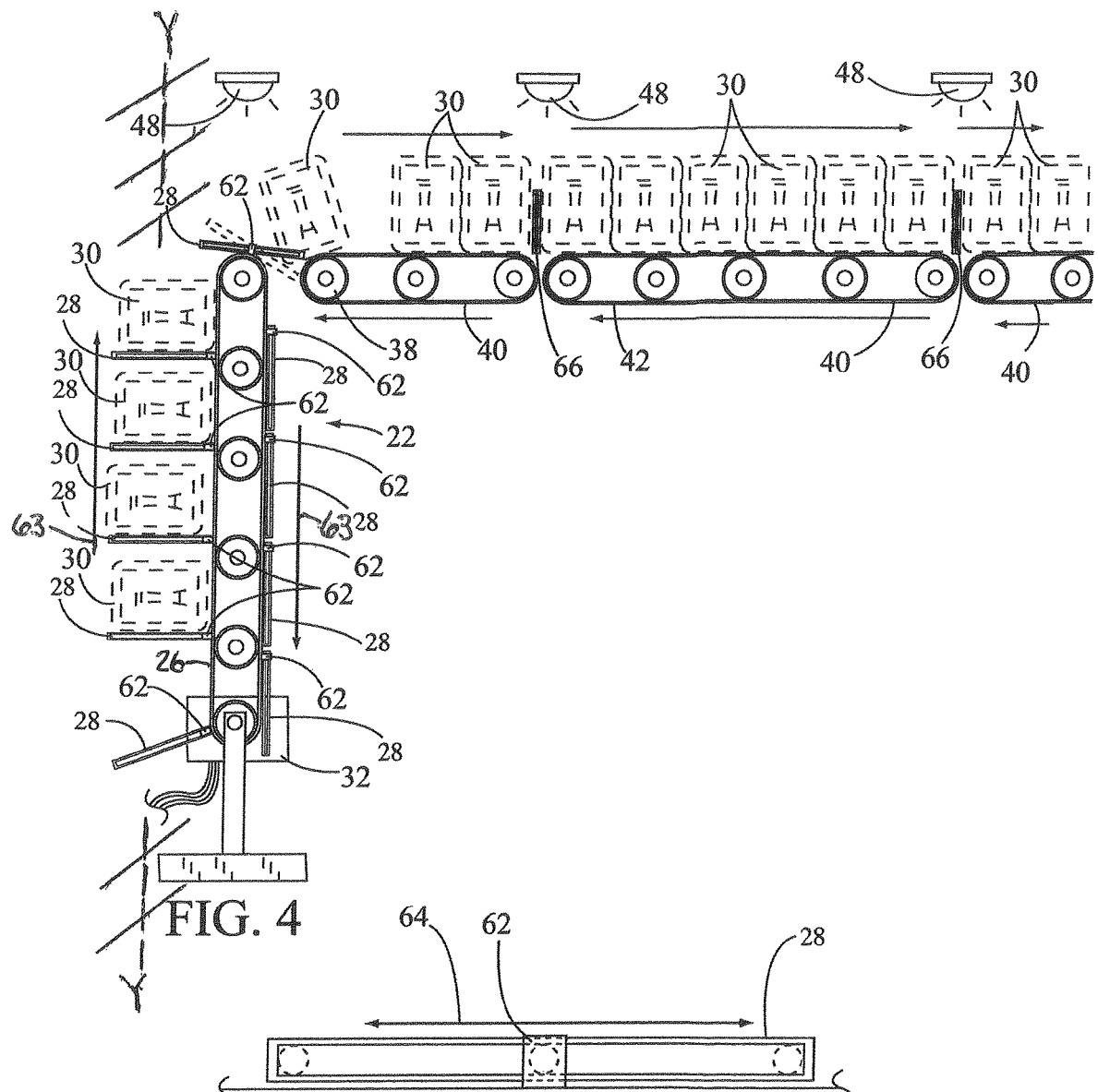
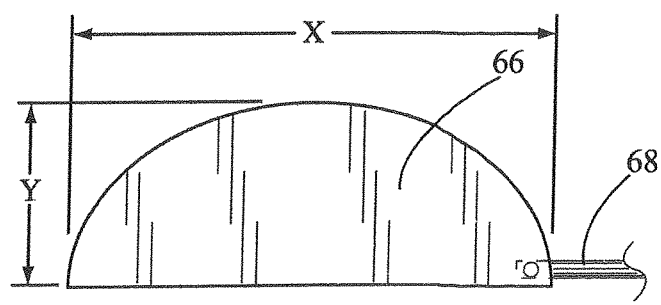
FIG. 5
FIG. 6

BAGGAGE CONVEYOR AND STORAGE SYSTEM

This non-provisional Continuation In Part (CIP) patent application claims the benefit of the subject matter and the filing date of a non-provisional Parent patent application Ser. No. 15/212,207, filed on Jul. 16, 2016, having a title of "Baggage Conveyor and Storage System" by the subject inventor. The Parent Patent Application claims the benefit of the subject matter and filing date of a Provisional patent application, filed on Jul. 21, 2015, Ser. No. 62/194,872, having a title of "Parcel Storage System", by the subject Inventor.

BACKGROUND OF THE INVENTION

(a) Field of the Invention

This invention relates to a conveyor storage system for use in the transportation industry as well as other commercial uses and more particularly, but not by way of limitation, to an automated baggage conveyor and storage system adapted for mounting next to or nearby an entrance to an aircraft, train, bus, boat, and like vehicles. The conveyor and storage system, in particular, is used for receiving and storing baggage, in an overhead compartment or bin, when received from aircraft passengers.

(b) Discussion of Prior Art

Heretofore, there have been various types of fixed and mobile horizontal and vertical conveying systems. The systems are used in different industries for handling a variety of goods and products. The subject invention provides a unique conveying system for eliminating the need for passengers to struggle with lifting bags into or out of overhead storage compartments in an aircraft or other vehicle.

SUMMARY OF THE INVENTION

In view of the foregoing, it is a primary objective of the subject invention to provide a travel passenger a convenient and efficient way for storing his or her baggage when boarding an aircraft, train, bus, boat and like vehicles.

Another advantage of the subject invention is the conveyor and storage system eliminates the passenger having to lift his or her baggage into an overhead storage compartment, which quite often is difficult to reach and could result in an injury.

Yet another advantage is the conveyor and storage system is the passenger can load his or her own baggage onto a vertical conveyor and without the assistance of a travel attendant. The passenger retains possession of his or her bag until he or she places it into the storage system.

Still another advantage of the invention is the system reduces incidences of baggage dropping on a passenger or employee possibly causing injury. Another advantage is that it reduces time when boarding a plane and other vehicles. Passengers entering the vehicle or aircraft will no longer be delayed in taking a seat because a passenger in front of them needs to stop in the aisle and lift his bag into an overhead bin. Also, a passenger will know the exact location of his or her bag and can obtain access to the bag during flight. Further, the system can be easily incorporated into different vehicle and aircraft body designs.

Also, the baggage conveyor and storage system, when used on an aircraft, is designed to meet FAA requirements and use FAA approved materials.

The subject conveyor and storage system includes a vertical conveyor, with drive motor, disposed next to an entrance to an aircraft or transportation vehicle. The vertical conveyor includes a plurality of foldable baggage trays mounted on a conveyor belt and under the control of an electronic sensor for starting and stopping the conveyor belt. Also, flexible slings or bins can be used in lieu of foldable trays. Next to the top of the vertical conveyor is disposed one end of a motor driven, horizontal conveyor. The horizontal conveyor runs the length of the aircraft's overhead storage compartment. When a passenger places his or her bag on one of the baggage trays, it is lifted to the top of the vertical conveyor and then transferred to the horizontal conveyor. The bag is then moved along a length of the overhead storage compartment to the next available position where the bag remains stored during flight.

These and other objects of the present invention will become apparent to those familiar with different types of conveyor storage systems when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE D WINGS

FIG. 4 is a front view of another embodiment of the baggage conveyor and storage system wherein the foldable trays attached to tray slides are used to tip the piece of baggage onto its side as it is deposited on the horizontal conveyor belt.

FIG. 5 is a side view of one of the tray slides.

FIG. 6 is a front view of a retractable baggage stabilizer used to stabilize the baggage on the horizontal conveyor.

DETAINED DESCRIPTION OF THE PREFERRED EMBODIMENTS

Figure 1:
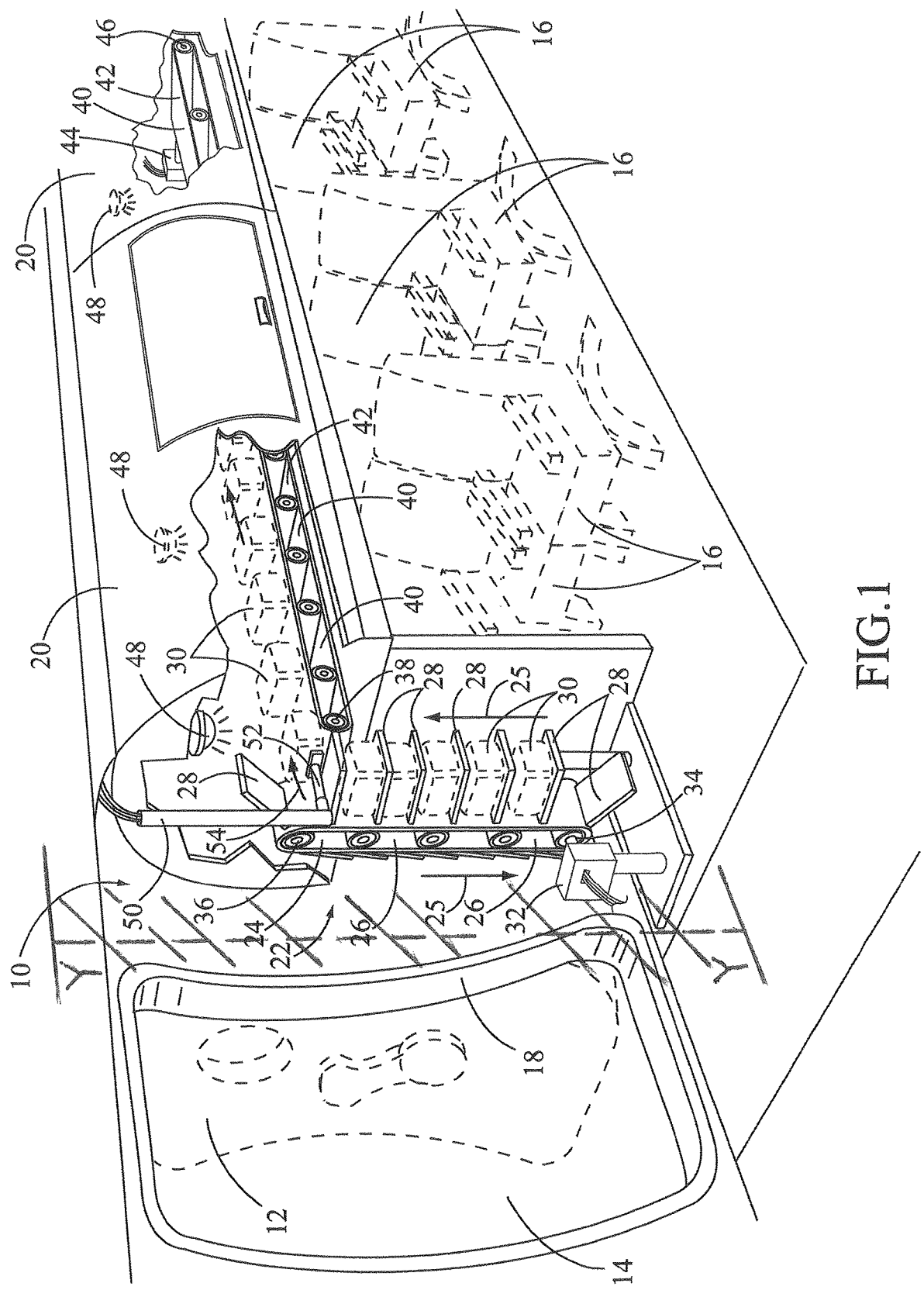
FIG. 1 is a perspective view of a portion of an aircraft with the subject baggage conveyor and storage system disposed next to an aircraft entrance.

The accompanying drawings illustrate preferred embodiments in the present invention according to the best modes presently devised for the practical application of the subject baggage conveyor and storage system, and in which:

In FIG. 1, a perspective view of a portion of a passenger aircraft is shown having general reference numeral 10. The aircraft 10 includes a door 12 with a passenger entrance 14, passenger seats 16, a side wall 18 and an overhead storage compartment 20, above the seats 16. While the aircraft 10 is shown in the drawings, it should be kept in mind the subject invention will work equally well with other forms of transportation vehicles. The side wall 18 of the aircraft 10 is disposed next to a vertical plane, illustrated with diagonal lines, and having a vertical axis Y-Y, shown in dashed lines.

The subject baggage conveyor and storage system is shown having general reference numeral 22 and disposed next to the vertical plane. The system 22 includes a vertical conveyor 24, with a vertical conveyor belt 26, and a plurality of spaced apart, foldable baggage trays 28. The trays 28 are designed to fold into a vertical position, next to the vertical conveyor belt 26, when moving downward on the vertical conveyor belt 26 and then move upward into a horizontal, locked position for receiving and carrying s piece of baggage 30 thereon, as shown in the drawings.

As each foldable baggage tray 28 reaches the top of the vertical conveyor belt 26 the piece of baggage 30, resting on the tray 28, is pushed onto the horizontal conveyor belt 40 by a periscope telescoping pusher 52. The foldable baggage tray 28, no longer holding a piece of baggage 30, rotates around the top of the vertical conveyor belt 26 and folds to a vertical hanging position.

It should be noted that in this embodiment of the invention, the vertical conveyor belt 26 is parallel to the vertical plane of the aircraft 10 and the baggage trays 28 in the horizontal load supporting position are perpendicular to the vertical plane while the baggage trays 28 in the vertical folded position are parallel to the vertical plane. The drawing illustrates the horizontal foldable baggage trays 28 each holding the piece of baggage 30, shown in dotted lines. An electric motor 32 is attached to a vertical conveyor drive pulley 34 mounted on a lower end of the conveyor belt 26 and is used to move the vertical conveyor belt 26 in the directions indicated by arrows 25. A vertical conveyor idle pulley 36 on the vertical conveyor belt 26 is disposed in one end of the storage compartment 20.

Next to the idle pulley 36, inside the compartment 20, is mounted a horizontal conveyor idle pulley 38, mounted on the horizontal conveyor belt 40 of a horizontal conveyor 42. An electric motor 44 is attached to a drive pulley 46 on the horizontal conveyor belt 40 and is mounted on the opposite end of the storage compartment 20. The horizontal conveyor belt 40 may be a continuous belt along a length of the overhead compartments or broken into segmented belts the length of each overhead compartment or bin.

The baggage and conveyor system 22 also includes programmable, electronic sensors 48. The sensors 48 are used for monitoring the operation of the system and the movement of the vertical conveyor 24 and the horizontal conveyor 42. Also, one of the sensors can be programmed to notify a passenger, via a phone app, the exact location of his or her baggage in the system. Further, one of the sensors 48 activates a pusher control mechanism 50 which regulates movement of the periscope telescoping pusher 52. The periscope telescoping pusher 52 is activated when the foldable baggage tray 28 carrying a piece of baggage 30 reaches the top of the vertical conveyor 24 and the foldable baggage tray 28 is level with the horizontal conveyor belt 40.

At this point, an electronic sensor 48 signals the vertical conveyor 24 to stop. Then the periscope telescoping pusher 52 is activated and pushes the piece of baggage 30 from left to right onto the horizontal conveyor belt 40, which will move the piece of baggage 30 to the next available storage space within the storage compartment 20. An arrow 54 indicates the direction of the movement of the periscope telescoping pusher 52, as it moves the piece of baggage 30 off the foldable baggage tray 28 and onto the horizontal conveyor belt 40.

Also, a sensor 48 indicates that the piece of baggage 30 is completely on the horizontal conveyor belt 40 and signals the pusher 52 to retract into a closed position. The sensor 48 then signals the vertical conveyor 24 to restart. The baggage tray 28, from which the piece of baggage 30 was removed, falls into a folded position as it rotates around the top of the vertical conveyor 24. The next baggage tray 28 supporting a piece of baggage 30 then ascends to the top of the vertical conveyor 24 and the process repeats itself. At the end of the flight, both the vertical conveyor belt 26 and the horizontal conveyor belt 40 reverse direction to deliver a piece of baggage 30 to the passenger as he deplanes.

Figure 2:
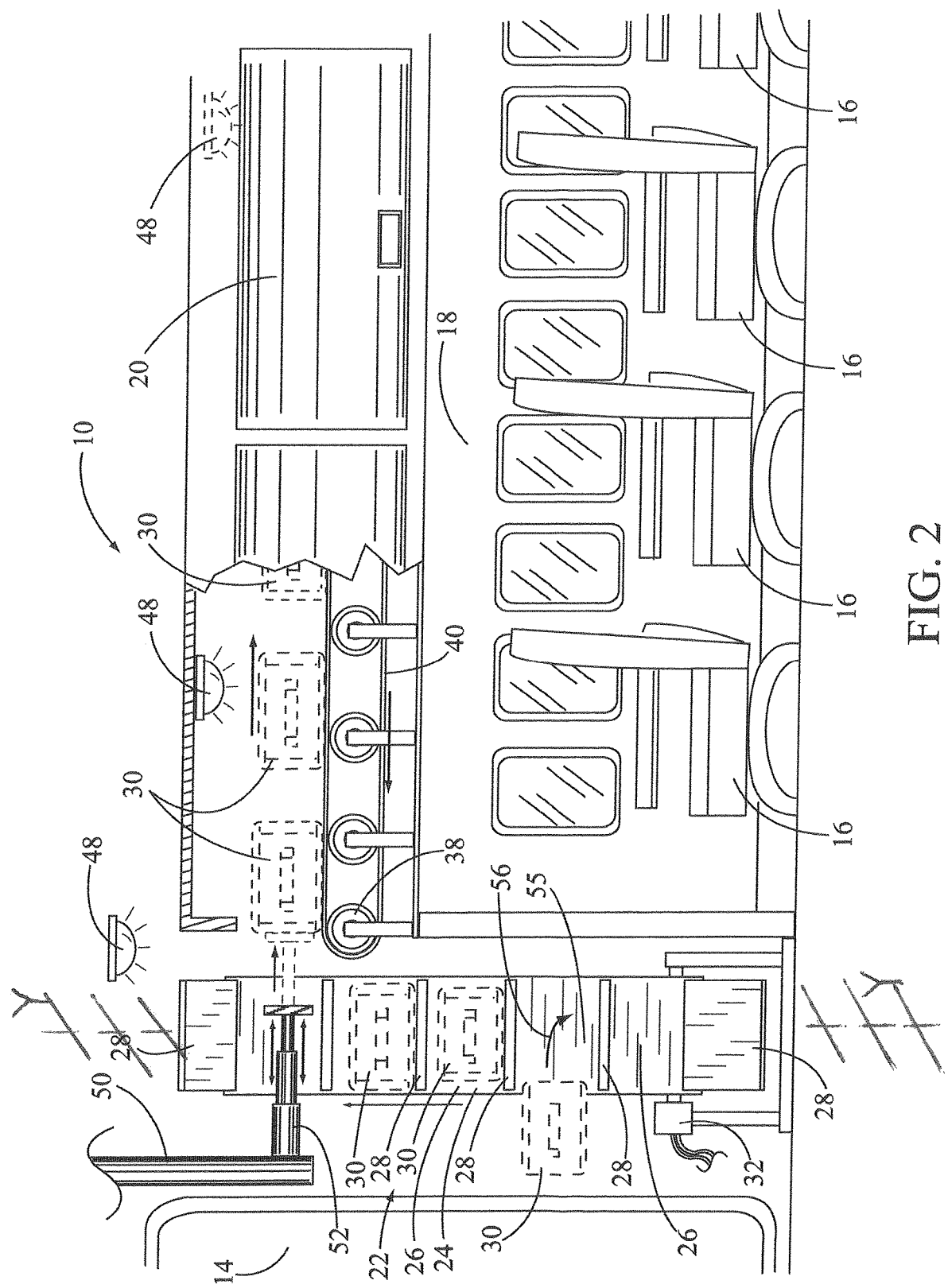
FIG. 2 is a front view of the baggage conveyor and storage system.

In FIG. 2, a side view of the portion of the aircraft 10 is shown with the subject baggage conveyor and storage system 22 shown and mounted next to the passenger entrance 14. In this drawing, a piece of baggage 30, on the far left, is shown being placed through a portal 55, as indicated by arrow 56, onto one of the foldable baggage trays 28. An electronic sensor 48, above the vertical conveyor 24, is programmed to signal the electric motor and drive pulley 32 to stop and then start the vertical conveyor 24. This intermittent upward movement of the vertical conveyor 24 provides a pause so the next available empty foldable baggage tray 28 becomes aligned with the portal 55. In this position the tray 28 is waiting to receive the next piece of baggage 30 for storage from a passenger entering the aircraft. In this manner, the baggage 30 is intermittently loaded onto the vertical conveyor 24.

When a baggage tray 28 holding a piece of baggage 30 reaches the top of the vertical conveyor 24, and the baggage tray 28 is level with the horizontal conveyor belt 40, the vertical conveyor 24 stops. A sensor 48 then activates the periscope telescoping pusher 52 and the piece of baggage 30 is pushed off the baggage tray 28 and onto the horizontal conveyor belt 40. A sensor 48 indicates that the piece of baggage 30 is completely on the horizontal conveyor belt 40 and signals the pusher 52 to retract into a closed position. A sensor 48 now signals the vertical conveyor 24 to restart. The baggage tray 28, from which the bag 30 was removed, then falls into a folded position as it rotates around the top of the vertical conveyor 24. After being placed on the horizontal conveyor belt 40, the piece of baggage 30 is moved on the horizontal conveyor belt 40 to the next available storage space within the overhead storage compartment 20. The next baggage tray 28 supporting a piece of baggage 30 ascends to the top of the vertical conveyor 24 and the process repeats itself.

When the aircraft has completed its flight, an electronic sensor 48 signals the electronic motor and drive pulley 32 to reverse the direction of the vertical conveyor belt 26. An electronic sensor 48 also signals the electric motor 44 and drive pulley 46 for the horizontal belt 40 to reverse direction. The reverse motion of the vertical conveyor belt 26 again is intermittent thus allowing a foldable baggage tray 28 carrying baggage 30 to be aligned with the portal 55 for removal of the bag 30 from the system. During this unloading process, the telescoping pusher 52 remains inactive and in a closed position.

Figure 3:
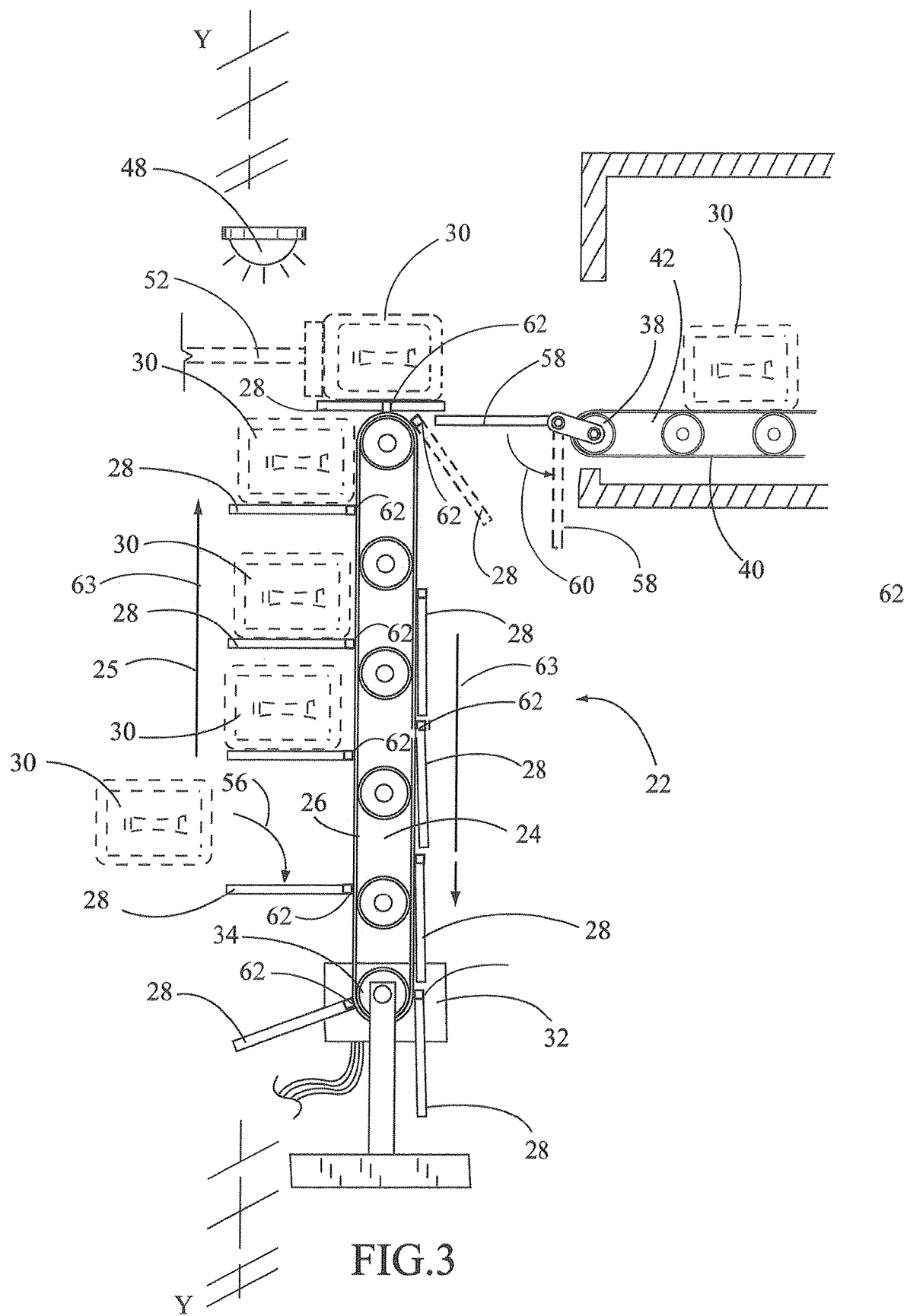
FIG. 3 is a front view of a different embodiment of the baggage conveyor and storage system.

In FIG. 3, another embodiment of the baggage conveyor and storage system 22 is shown and is similar to the system illustrated in FIGS. 1 and 2. In this drawing, the vertical conveyor 24 has been rotated 90 degrees and the vertical conveyor 24 is now perpendicular to the vertical plane indicated by the Y-Y axis next to the side wall 18 of the aircraft 10. Also, the foldable baggage trays 28 attached to the tray slides 62, in both the vertical folded position and horizontal load supporting position, are perpendicular to the vertical plane with axis Y-Y. The tray slide 62 is shown in detail in FIG. 5.

In operation, when a foldable baggage tray 28 attached to a tray slide 62, with a piece of baggage 30 thereon, reaches top of the vertical conveyor 24, the baggage tray 28 holding the piece of baggage 30 moves horizontally, across the top of the vertical conveyor 24 in a left to right motion. The baggage tray 28 then comes to rest on top of the support arm 58, which is extended to support the baggage tray 28. The vertical conveyor 24 now stops moving. The baggage tray 28 is level with the horizontal belt 40 and the piece of baggage 30 is in position to be moved onto the horizontal conveyor 42 for storage.

An electronic sensor 48 now activates the telescoping periscope pusher 52, shown in dashed lines. The telescoping periscope pusher 52 pushes the piece of baggage 30 off the baggage tray 28 and onto the horizontal belt 40. An electronic sensor 48 indicates that the bag 30 is completely on the horizontal belt 40 and signals the telescoping periscope pusher 52 to retract into a closed position. Also, another electronic sensor 48 signals the support arm 58 to drop into a vertical hanging position. The electronic sensor 48 signals the vertical conveyor 24 to restart. As the vertical conveyor 24 resumes its motion, the baggage tray 28, from which the piece of baggage 30 was removed, falls into a folded position and continues its descent on the vertical conveyor 24.

The intermittent stopping and restarting of the vertical conveyor belt 26 allows a pause so that a piece baggage 30 can be inserted through the portal 55 while the piece of baggage 30 at the top of the vertical conveyor 24 is being moved unto the horizontal conveyor belt 40. The baggage tray 28 attached to a tray slide 62 is designed so that both the upper side and underside of the baggage tray 28 will alternate supporting the bag 30. At the end of the flight the process reverses to provide the baggage 30 to passengers as they deplane. The pusher 52 remains inactive when the process reverses.

In FIG. 4 is a front view of another embodiment of the baggage conveyor and storage system 22 is shown. In this drawing, the vertical conveyor 24 has been rotated 90 degrees and the vertical conveyor 24 is now perpendicular to the vertical plane, next to the side wall 18 of the aircraft 10. Also, the baggage trays 28 attached to the tray slides 62 in both the vertical folded position and horizontal load supporting position are perpendicular to the vertical plane with axis Y-Y. The tray slide 62 is shown in detail in FIG. 5.

In this embodiment, each baggage tray 28 is attached to a tray slide 62 and is pivotally mounted on the vertical conveyor belt 26. When a baggage tray 28 supporting a piece of baggage 30 reaches the top of the vertical conveyor 24 and begins to move across the top of the vertical conveyor 24, from left to right, the baggage tray 28 tips towards the horizontal conveyor belt 40. The tray slide 62 facilitates the tipping motion of baggage tray 28. The piece of baggage 30 on the baggage tray 28 is turned on its narrowest side, typically the 9 inch side. As the piece of baggage 30 comes in contact with the moving horizontal conveyor belt 40, the bag 30 is pulled off the tipping baggage tray 28 and onto the horizontal conveyor belt 40.

After the piece of baggage 30 is released onto the horizontal conveyor belt 40, the baggage tray 28, enabled by the tray slide 62, continues to fall into a vertical folded position continues its descent on the vertical conveyor belt 26.

Once on the horizontal conveyor belt 40, the piece of baggage 30 is moved by the conveyor belt 40 to the next available storage space inside the storage compartment 20, as shown in FIGS. 1 and 2. The intermittent stopping and restarting of the vertical conveyor belt 26 allows a pause so that a piece of baggage 30 can be inserted through the portal 55, while another piece of baggage 30 at the top of the vertical conveyor 24 is being moved through the horizontal conveyor belt 40. The baggage tray 28, attached to a tray slide 62, is designed so that both the upper side and underside of the baggage tray 28 will alternate support the piece of baggage 30.

During the operation of the storage system, one of the sensors 48 signals the horizontal conveyor belt 40 to stop when a full number of allowable bags are in the overhead compartment 20. At this time a sensor 48 automatically signals the retractable baggage stabilizer 66, shown in FIG. 6, to be inserted between two pieces of baggage 30. The retractable baggage stabilizer 66 prevents weight shifting during travel, flight take off, flight landing and certain interrupted stops and starts.

At the end of the flight the retractable baggage stabilizers 66 retract from their position between the two pieces of baggage 30 and are stored in the folded position, the movement of both the horizontal conveyor belt 40 and the vertical conveyor belt 26 reverse direction to deliver baggage 30 to the portal 55 for retrieval by the passengers In FIG. 5, a side view of one of the baggage trays 28 centered on the tray slide 62. Arrow 64 indicates the movement of the baggage tray 28, from left to right and right to left on the tray slide 62. The baggage tray 28, attached to the tray slide 62, is designed so both the upper side and the underside of the baggage tray 28 will alternately support the bag 30 as it ascends on the vertical conveyor belt 26.

In FIG. 6, a front view of the retractable baggage stabilizer 66 is shown with a pivot arm 68. The pivot arm 68 is attached to a rear wall of overhead compartment and used for folding the retractable baggage stabilizer 66 between two pieces of the baggage 30. The length "X" of the retractable baggage stabilizer 66 is typically in a range of 20 to 30 inches and the height "Y" in a range of 8 to 10 inches.

When actuated by one of the electronic sensors 48, the retractable baggage stabilizer 66 and pivot arm 68 are activated from a resting or folded position against the rear wall of the overhead compartment 20 and positioned between two pieces of baggage 30 on the horizontal conveyor belt 40. For example, in FIG. 4, the position of two of the retractable baggage stabilizers 66 corresponds with the length of one of segments of the horizontal conveyor belt 40. This segment of the horizontal conveyor belt 40 holds six pieces of baggage 30. One baggage stabilizer 66 is positioned to the left of the first piece of baggage 30 and the second retractable baggage stabilizer 66 is position on the right of the sixth piece of baggage 30. The retractable baggage stabilizers 66 prevent the baggage 30 from shifting position while in transit. The horizontal conveyor 42 can be comprised of segments of varying lengths, each segment holding a specified number of pieces of baggage 30.

As mentioned above, the electronic sensors 48 have various functions and are programmed to operate the movement of the two conveyors, the movement of the pusher 52 for moving the baggage 30, the movement of the support arm 58, the movement of the pivot arm 68 and monitor the location of a piece of baggage 30 and to notify passengers of the location of their piece of baggage 30 within the system 22.

While the invention has been particularly shown, described and illustrated in detail with reference to the preferred embodiments and modifications thereof, it should be understood by those skilled in the art that equivalent changes in form and detail of the baggage conveyor and storage system can be made therein without departing from the true spirit and scope of the invention as claimed except as precluded by the prior art.

The invention claimed is:

1. An automated baggage conveyor and storage system adapted for use next to or near an entrance of an aircraft, train, bus, or boat for receiving a piece of baggage from a passenger, the system adapted for moving baggage along a length of an overhead storage compartment where the baggage remains stored during transit, the system comprising:
   a vertical conveyor with a drive motor and a vertical conveyor belt;
   a plurality of foldable baggage trays, each of the trays attached to a tray slide mounted on the vertical conveyor belt, the vertical conveyor and the foldable baggage trays adapted to raise the piece of baggage vertically;
   an electronic sensor for starting and stopping the motor driving the vertical conveyor belt;
   a horizontal conveyor with a drive motor and a horizontal conveyor belt, one end of the horizontal conveyor belt disposed next to an upper end of the vertical conveyor belt, the horizontal conveyor adapted for receipt in the overhead storage compartment, the horizontal conveyor adapted to transport the piece of baggage horizontally;
   a support arm pivotally attached on the horizontal conveyor belt, the support arm extending from one end of the horizontal conveyer to the top of the vertical conveyor belt, the support arm used for receiving and supporting one of the foldable baggage trays and holding the piece of baggage in position to be transferred from the vertical conveyor to the horizontal conveyor: and
   a periscope with a telescoping pusher mounted next to the top of the vertical conveyor belt and adapted for pushing the piece of baggage off one of the foldable baggage trays being supported by the support arm onto the horizontal conveyor belt thereby transferring the piece of baggage from the vertical conveyor onto the horizontal conveyor.

2. The system as described in claim 1 wherein an overhead electronic sensor is used to activate the operation of the periscope and the telescoping pusher.

3. The system as described in claim 1 wherein the horizontal conveyor is broken into individual conveyor segments making up the length of the horizontal conveyor.

4. The system as described in claim 3 wherein the conveyor segments have a length of individual compartments in the overhead storage compartment.

5. The system as described in claim 1 wherein the vertical conveyor belt is perpendicular to a vertical plane next to a side wall of the aircraft, train, bus, or boat and the foldable trays on the vertical conveyor belt are perpendicular to the vertical plane.

6. The system as described in claim 1 wherein an overhead electronic sensor is used to activate and raise and lower the support arm on the horizontal conveyor belt.

7. The system as described in claim 1 further including a plurality of baggage stabilizers adapted for pivotal attachment to the storage compartment, the baggage stabilizers disposed next to the horizontal conveyor belt, each baggage stabilizer adapted for placement between two pieces of baggage and securing the baggage on the horizontal conveyor and preventing weight shift when the aircraft, train, bus, or boat is moving.

8. An automated baggage conveyor and storage system adapted for use next to or near an entrance of an aircraft, train, bus, or boat for receiving a piece of baggage from a passenger, the system adapted for moving baggage along a length of an overhead storage compartment, where the baggage remains stored during transit, the system comprising:
   a vertical conveyor with a drive motor and a vertical conveyor belt;
   a plurality of foldable baggage trays, each of the trays attached to a slide mounted on the vertical conveyor belt, the vertical conveyor and the baggage trays adapted to raise the piece of baggage vertically;
   an electronic sensor for starting and stopping the motor driving the vertical conveyor belt;
   a horizontal conveyor with a drive motor and a horizontal conveyor belt, one end of the horizontal conveyor belt disposed next to an upper end of the vertical conveyor belt, the horizontal conveyor adapted for receipt in the overhead storage compartment, the horizontal conveyor adapted to transport the piece of baggage horizontally;
   a support arm pivotally attached on the horizontal conveyor belt, the support arm extending from one end of the horizontal conveyer to the top of the vertical conveyor belt, the support arm used for receiving and supporting one of the foldable baggage trays and holding the piece of baggage in position to be transferred from the vertical conveyor to the horizontal conveyor;
   a periscope with a horizontal, telescoping pusher, the periscope and pusher are mounted next to the top of the vertical conveyor belt, the pusher adapted for pushing the piece of baggage off one of the foldable baggage trays being supported by the support arm onto the horizontal conveyor belt thereby transferring the piece of baggage from the vertical conveyor onto the horizontal conveyor; and
   a baggage stabilizer for placement between two pieces of baggage on the horizontal conveyor, the baggage stabilizer disposed next to the horizontal conveyor.

9. The system as described in claim 8 wherein an overhead electronic sensor is used to activate the operation of the periscope and the telescoping pusher.

10. The system as described in claim 8 wherein the horizontal conveyor is broken into individual conveyor segments making up the length of the horizontal conveyor.

11. The system as described in claim 10 wherein the conveyor segments have a length of individual compartments in the overhead storage compartment.

12. The system as described in claim 8 wherein the vertical conveyor belt is perpendicular to a vertical plane next to a side wall of the aircraft, train, bus, or boat and the foldable trays on the vertical conveyor belt are perpendicular to the vertical plane.

13. The system as described in claim 8 wherein an overhead electronic sensor is used to activate and raise and lower the support arm on the horizontal conveyor belt.

14. The system as described in claim 8 further including more than one of the baggage stabilizers adapted for pivotal attachment to the storage compartment, the baggage stabilizers disposed next to the horizontal conveyor belt, each baggage stabilizer adapted for receipt between a pair of baggage and securing the baggage on the horizontal conveyor and preventing weight shift when the aircraft, train, bus, or boat is moving.

\* \* \* \* \*